United States Patent [19]

Kilmoyer

[11] Patent Number: 4,553,759

[45] Date of Patent: Nov. 19, 1985

[54] VALVE AND IMPROVED STEM SEAL THEREFOR

[75] Inventor: James E. Kilmoyer, Houston, Tex.

[73] Assignee: Cameron Iron Works, Inc., Houston, Tex.

[21] Appl. No.: 680,185

[22] Filed: Dec. 10, 1984

[51] Int. Cl.[4] .................... F16J 15/18; F16K 41/04
[52] U.S. Cl. ..................................... 277/12; 277/165; 277/205; 251/214
[58] Field of Search ................ 277/12, 32, 165, 189, 277/205, 206 R, 207 R, 212 R, 212 C; 251/214

[56] References Cited

U.S. PATENT DOCUMENTS

| | | | |
|---|---|---|---|
| 1,844,409 | 2/1932 | Rypinski | 277/205 X |
| 3,223,426 | 12/1965 | Reid | 277/205 X |
| 3,554,569 | 1/1971 | Gorman | 277/205 |
| 3,603,603 | 9/1971 | Woodson | 277/165 |
| 3,653,672 | 4/1972 | Felt | 277/205 |
| 3,916,943 | 11/1975 | Hester et al. | 251/214 X |

FOREIGN PATENT DOCUMENTS

| | | | |
|---|---|---|---|
| 486425 | 9/1952 | Canada | 251/214 |
| 1406221 | 6/1965 | France | 277/205 |

*Primary Examiner*—Robert S. Ward

*Attorney, Agent, or Firm*—Vinson & Elkins

[57] ABSTRACT

An improved valve with an improved stem seal including a body having a valve chamber, an inlet to and an outlet from the valve chamber, and a valve seat in the valve chamber, a valve member movable in the valve chamber and coacting with the valve seat to control flow through the valve, a valve stem connected to the valve member and extending through an opening in said body, means coacting with said stem to move said valve member, a stem sealing assembly positioned in said opening surrounding said stem and means for retaining the stem sealing assembly in position, said assembly including a wear resistant and corrosion resistant sealing ring having a plurality of internal and external grooves with internal and external sealing lips between the grooves, and an annular end recess opening toward the valve member, a soft sealing ring in each of the inner rod outer grooves fartherest from said valve member and a load ring positioned in said end recess and having a tapered external surface extending toward the axis of said stem in a direction toward said valve member. In a modified form of said sealing assembly the load ring also includes an internal taper extending toward the axis of said stem in a direction away from the valve member.

17 Claims, 4 Drawing Figures

VALVE AND IMPROVED STEM SEAL THEREFOR

BACKGROUND

Valves, such as gate valves and chokes, in recent years are expected to operate in a corrosive atmosphere, to retain pressures such as 15,000 psig and to function at a wide range of temperatures, such as from 250° F. to 20° F. One of the difficulties encountered in such valves is the failure of the stem seal.

In some prior valves an elastomer has been used to energize the seal. The elastomers deteriorate with time as a result of the presence of $H_2S$, corrosion inhibitors, high temperatures, gas decompression, and compression set.

In other prior valve design, a stamped metal spring has been used to energize a polytetrafluoroethylene lip seal. The spring must be thin and weak to provide the desired flexibility. Therefor, the sealing lips must be sufficiently thin so that the spring can energize them properly. Such thin lips have poor wear resistance and at high temperature the polytetrafluoroethylene lips soften and are distorted by the edges of the spring resulting in seal failure.

The following U.S. patents disclose shaft and stem seals which may be pertinent with respect to the present invention: U.S. Pat. No. 4,410,189 discloses a shaft seal having a tapered load ring to wedge the sealing lip into sealing engagement with the surfaces to be sealed. U.S. Pat. No. 4,426,093 discloses a stem seal for a valve which is a cylindrical sleeve with spaced external circumferential cuts to enable the sleeve to act as a loose stack of washers in sealing. U.S. Pat. No. 3,787,060 discloses a stem seal having a wedge sleeve forced into the stem packing to ensure sealing against the stem and the inner wall of the housing bore. U.S. Pat. No. 4,262,690 discloses wedges used to move rings into position to prevent extrusion of sealing rings in a stack of sealing rings.

SUMMARY

The present invention relates to an improved valve and to an improved stem seal for the valve. The structure of the present invention includes a valve body having a valve chamber, an inlet to and an outlet from the valve chamber and a valve seat in the valve chamber surrounding the outlet, a valve member movable in the valve chamber and coacting with the valve seat to control flow through the valve, a valve stem connected to the valve chamber and extending through an opening in said body, means coacting with said stem to move said valve member, a sealing assembly positioned in surrounding relation to said stem and within said body opening to provide stem sealing, and means for retaining said sealing assembly in said body opening, said sealing assembly including a filled polytetrafluoroethylene sealing ring having a plurality of internal and external grooves to provide internal and external sealing lips therebetween and an annular end recess facing toward said valve member, a soft sealing ring in the inner and outer grooves farthest from the valve member providing improved low temperature sealing, and a load ring positioned in said end recess, said load ring having an external surface which is tapered toward the axis of said stem in the direction toward said valve member whereby said load ring maintains said seal ring lips in sealing position over a wide range of temperatures without causing compression setting of such lips.

An object of the present invention is to provide an improved valve with an improved stem seal in which the sealing ring maintains its seal over wide ranges of temperature.

Another object is to provide an improved valve and stem seal which allows use of sealing materials which have good wear resistance and corrosion resistance while providing bubble tight sealing under varying temperatures.

A further object is to provide an improved stem sealing assembly in which the loading of the seal ring is maintained under temperature variations without damaging the sealing elements of the seal ring.

Still another object is to provide an improved stem sealing assembly for a valve which avoids the problems of having a thin metal loading spring.

BRIEF DESCRIPTION OF THE DRAWINGS

This and other objects and advantages are hereinafter set forth and explained with reference to the drawings wherein.

DESCRIPTION OF PREFERRED EMBODIMENTS

Figure 1:
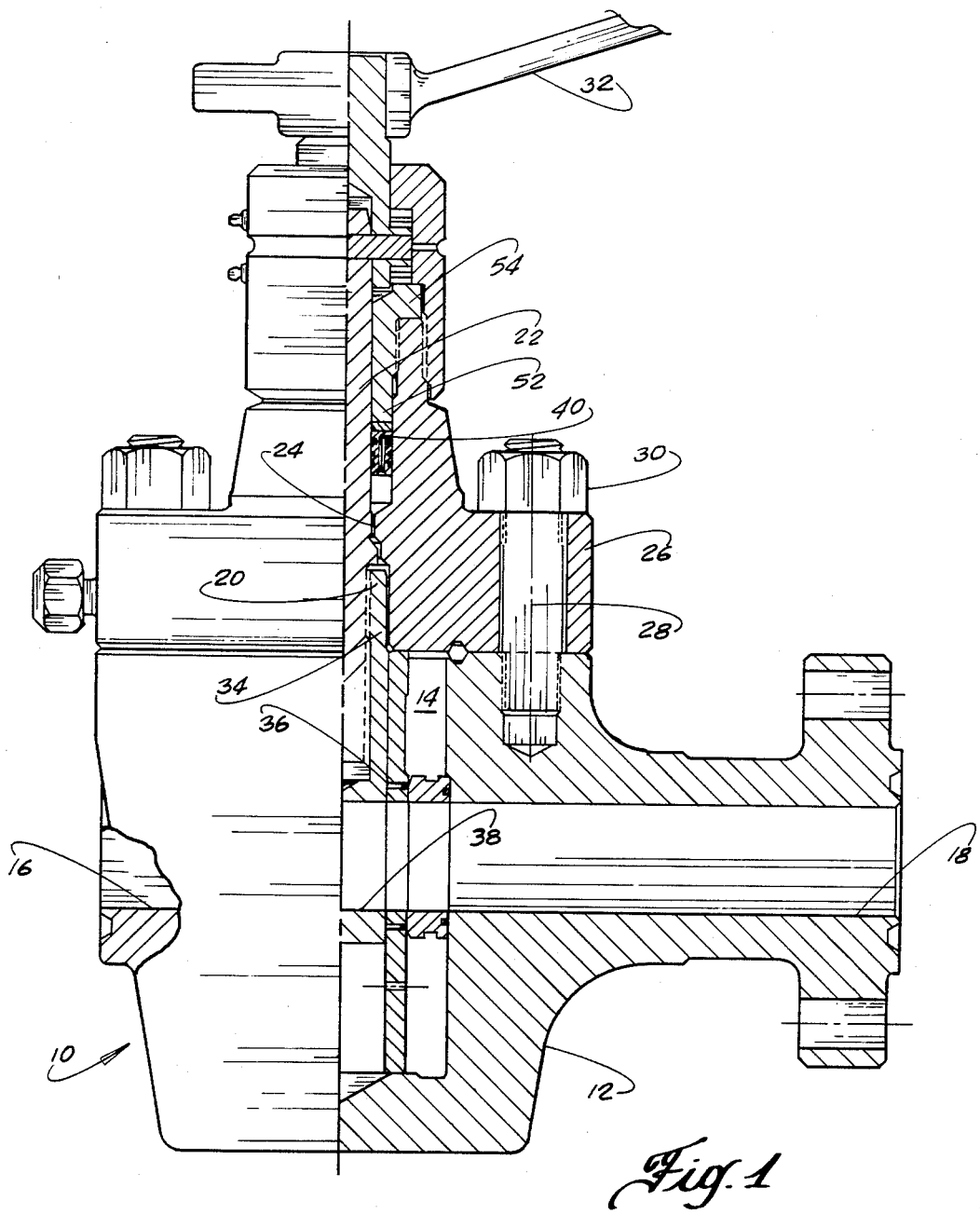
FIG. 1 is an elevation view, partly in section, of the improved valve of the present invention having the improved stem seal of the present invention installed therein to seal between the stem and the interior of the bonnet.

Valve 10, shown in FIG. 1, is a gate valve and has body 12 having a valve chamber 14 with inlet 16 and outlet 18 connecting through body 12 into chamber 14, valve member 20 movably positioned in valve chamber 14 with stem 22 connected to valve member 20 and extending through the opening provided by bore 24 through bonnet 26 which is secured to body 12 by studs 28 and nuts 30. Suitable means coacting with stem 22, such as handwheel 32 and the threaded connection 34 of stem 22 into valve member 20, are provided for moving valve member 20 in valve chamber 14 into position with relation to valve seat 36 which surrounds the opening of outlet 18 into valve chamber 14. In one position of valve member 20, it effectively closes the opening into outlet 18 and in its other position its port 38 is aligned with inlet 16 and outlet 18 to allow flow through outlet 18.

Figure 2:
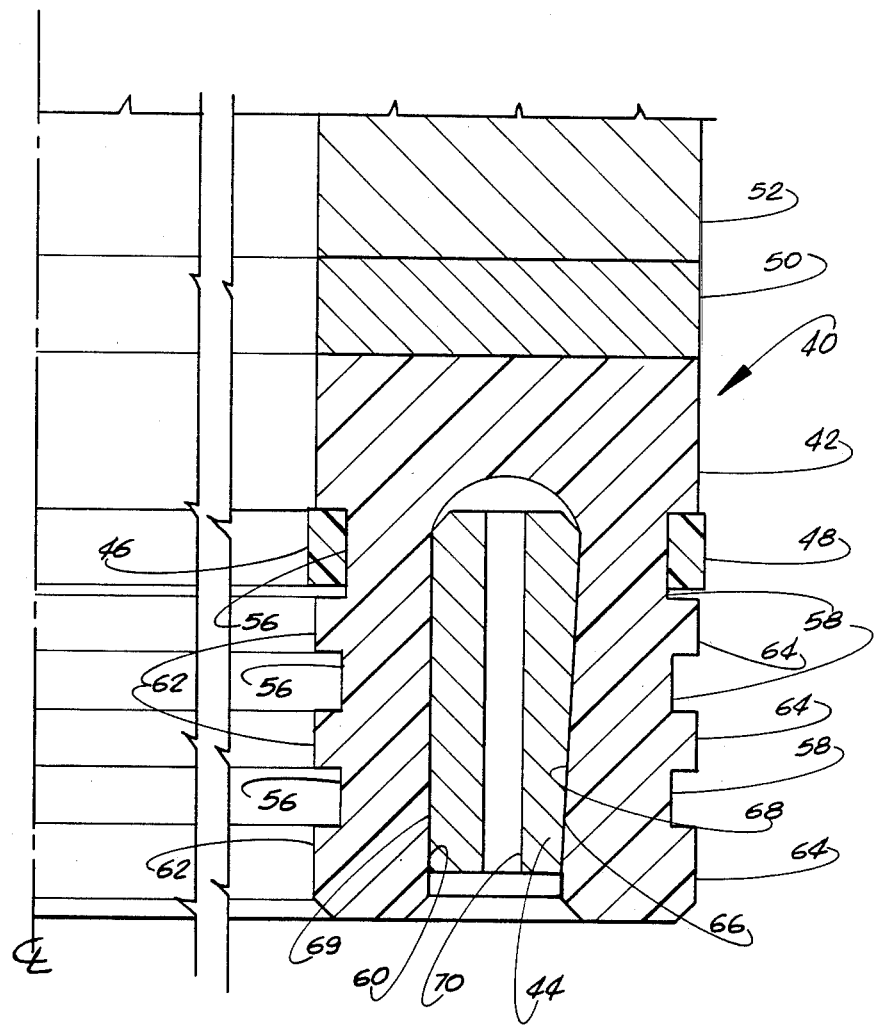
FIG. 2 is a partial sectional view of the preferred form of the improved stem seal of the present invention in relaxed position

Seal assembly 40, shown in FIG. 2, includes sealing ring 42, load ring 44, soft inner and outer seal rings 46 and 48, and anti-extrusion ring 50. The neck 52 of loading nut 54 is also included in FIG. 2 to illustrate that it engages ring 50. Sealing ring 42 is a ring formed from moderately filled polytetrafluoroethylene with the filling being a carbon material and being approximately eleven percent of the volume of the completed ring. Preferably the carbon filling material is a carbon powder with approximately ten percent of the powder being powdered graphite so that the composition of sealing ring 42 is approximately 89 percent polytetrafluoroethylene, ten percent powdered carbon and one percent powdered graphite. Sealing ring 42 is formed to have inner grooves 56, outer grooves 58 and end recess 60 into which load ring 44 is positioned. Inner and outer sealing lips 62 and 64 are defined between grooves 56 and 58. Inner and outer soft seal rings 46 and 48 are positioned in the closest of inner and outer grooves 56 and 58, respectively, to the closed end of sealing ring 42 or fartherest from valve member 20. Seal rings 46 and 48 each have a cross-sectional area greater than the cross-sectional area of the groove in which they are positioned to ensure that they are held in sealing engagement with the surface against which they are intended to seal. Soft seal rings 46 and 48 are virgin or soft polytetrafluoroethylene to improve low temperature sealing of the seal assembly 40 while such lower temperature following a hot thermal cycle can cause the lips 62 and 64 to relax their preload. In such case soft seal rings 46 and 48 ensure a bubble tight seal during the time that the temperature is sufficiently low to cause a relaxing of the preload on the sealing lips of sealing ring 42.

Of particular importance in seal assembly 40 is the shape of the exterior surface 66 of load ring 44 which tapers outwardly (thicker) in a direction toward anti-extrusion ring 50. This taper is also toward the axis of stem 22 in the direction toward valve member 20. Inner surface 69 on load ring 44 is substantially parallel to the axis of stem 22. Load ring 44 is preferably metal so that it maintains a rigid position within recess 60 and allows a differential expansion of sealing ring 42. The mating surface 68 on the interior of sealing ring is similarly tapered. Also, load ring 44 includes passages 70 to ensure that there is a pressure equalization across load ring 44 between the mouth of recess 60 and the inner end thereof.

Figure 3:
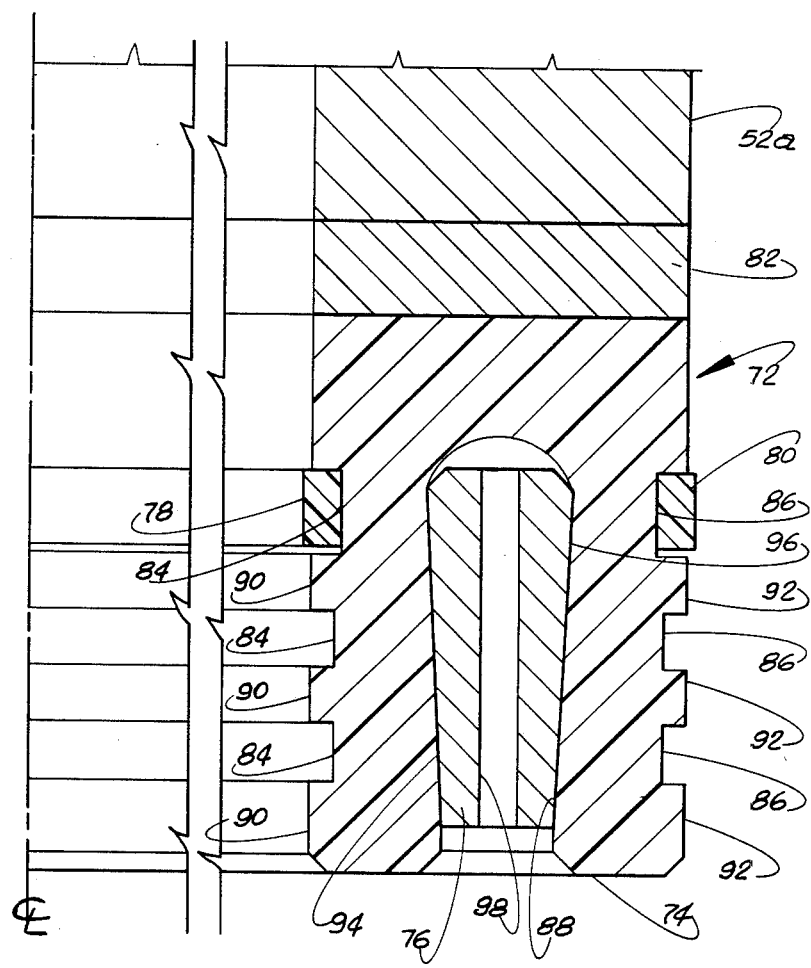
FIG. 3 is a partial sectional view of a modified form of improved stem seal of the prevent invention.

A modified form of the present invention is shown in FIG. 3. Sealing assembly 72 includes sealing ring 74, load ring 76 (preferably metal), soft inner and outer seal rings 78 and 80 and anti-extrusion ring 82. Neck 52a of a loading nut (not shown) is included in FIG. 3. Sealing ring 74 is of a material similar to sealing ring 42, previously described. Sealing ring 74 includes inner grooves 84 and outer grooves 86 and end recess 88 in which load ring 76 is positioned. Inner and outer sealing lips 90 and 92 are defined between grooves 84 and 86. Inner and outer soft seal rings 78 and 80 are positioned in the closest of inner and outer grooves 84 and 86, respectively, to anti-extrusion ring 82 or fartherest from the valve member. Seal rings 78 and 80 each have a cross-sectional area greater than the cross-sectional area of the groove in which they are positioned to ensure that they are held in sealing engagement with the surface against which they are intended to seal. Soft seal rings 78 and 80 are virgin or soft polytetrafluoroethylene as described with reference to soft seal rings 46 and 48.

Of particular importance in seal assembly 72 is the shape of recess 88 and the inner and outer surfaces 94 and 96 of load ring 76 which taper inwardly and outwardly, respectively in the direction toward anti-extrusion ring 82. Stated another way inner surface 94 tapers outward in the direction toward the valve member and outer surface 96 tapers inward in the direction toward the valve member. The shape of the interior of recess provides surfaces which mate with surfaces 94 and 96. Also, load ring 76 includes passages 98 to ensure that there is a pressure equalization between the mouth of recess 88 and the inner end thereof.

Figure 4:
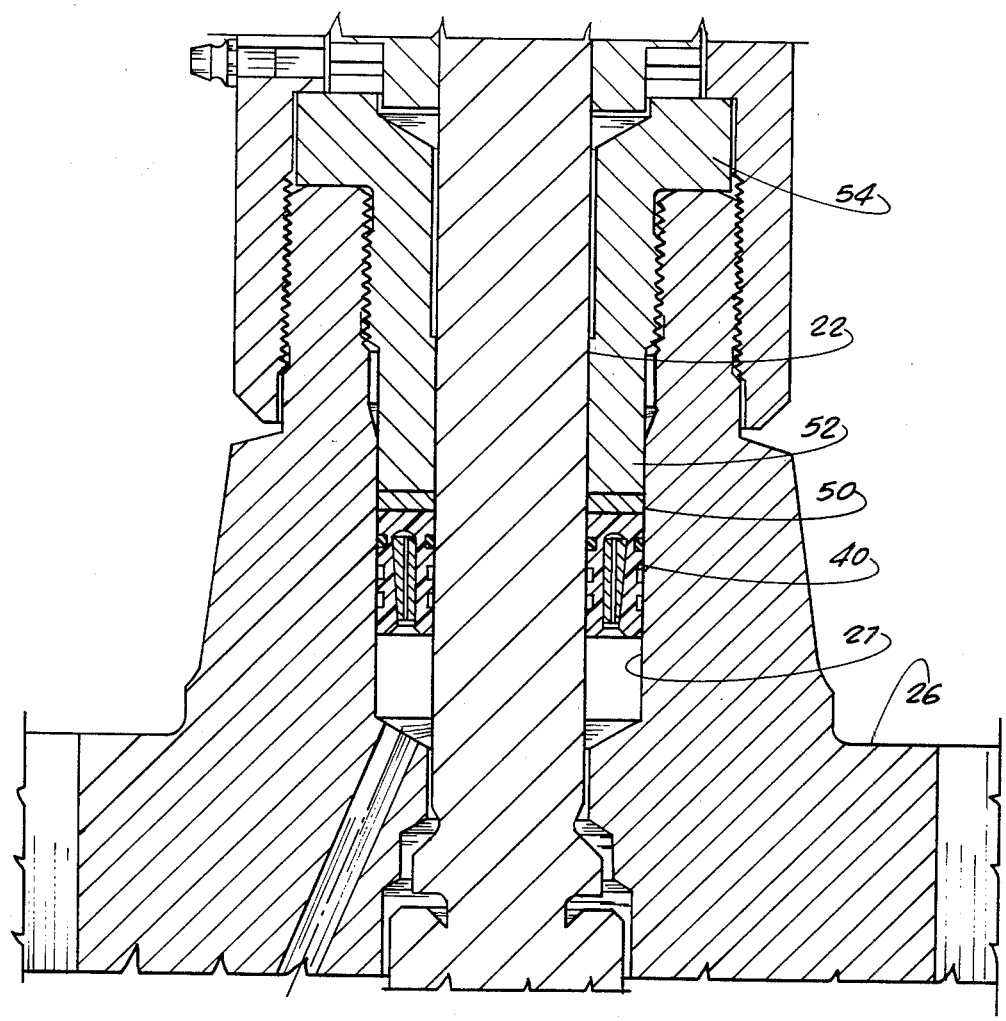
FIG. 4 is a partial sectional view of the valve shown in FIG. 1 to illustrate the improved stem seal installed to seal between the exterior of the stem and the interior of the bore through the bonnet.

Seal assembly 40, as shown in FIG. 4, is installed in position surrounding stem 22, within bore 27 through bonnet 26 and with loading nut tightened to provide an initial loading. A bubble tight seal is provided both by the soft seal rings 46 and 48 and by lips 62 and 64. As the seal assembly 40 is heated, the material of sealing ring 42 becomes softer, loses its memory and its mechanical properties decrease. In such situations, the position of the sealing lips 62 and 64 are controlled. The heating of the sealing ring 42 causes it to expand in both the axial and radial directions more than load ring 44 expands. The particular configuration of the seal assembly 40 allows the outer lips 64 to expand in the radial direction without becoming overstressed or distorted, because the expansion in the axial direction has an unwedging or relieving effect.

During the cooling of seal assembly 40, the outside diameter of lips 64 are trying to pull away from their sealing against bore 27 because lips 64 try to contract as a ring in the radial direction. Sealing ring 42 is also contracting in the axial direction and this contraction causes ring 42 to draw up against the outer taper on load ring 44 to wedge sealing lips 64 against bore 27.

While wedging principles have been used in seal designs previously, they have been mechanical members which are required to wedge and energize during pressure application. They are free to distort during changes in temperature with no pressure as in the cooling of the seal.

In some applications it may be desirable to utilize seal assembly 72 which is substantially the same as seal assembly 40 except for the inner tapered surface 94 on load ring 76. Such inner tapered surface 94 is used to avoid overstressing inner lips 90. It should also be noted that sealing rings 42 and 72 engage only smooth surfaces of load rings 44 and 76, respectively, and there are no sharp edges or gaps in springs to distort the sealing lips.

After cooling from a hot thermal cycle or on cooling to very low temperatures the preload on the sealing lips may not be as high as when initially installed, because of stress relaxation of the material of the sealing ring. The soft sealing rings shown in both forms of the present invention provide the initial seal since they have a preload of their own, i.e., they extend beyond their adjacent sealing lips, so that they remain in contact with the surface against which they are intended to seal.

The use of the two different materials produces the best advantages of each which includes the good wear resistance, the high temperature stability, the extrusion resistance of the moderately filled polytetrafluoroethylene and the flexibility and low temperature sealing of the soft polytetrafluoroethylene.

What is claimed is:

1. A valve comprising
a body having a valve chamber, an inlet into, an outlet from and an opening from said valve chamber extending through said body and a valve seat in said valve chamber surrounding said outlet,
a valve member movably positioned in said valve chamber,
a stem connected to said valve and extending through said opening,
means coacting with said stem to move said valve member with respect to said valve seat to control flow through said valve,
a stem sealing assembly for sealing between said stem and said opening and including a sealing ring having an internal and an external sealing lip and an end recess, and a load ring positioned in said end recess and having its external surface tapered toward the axis of said stem and toward said valve member, and means for retaining said stem sealing assembly between said stem and said opening.

2. A valve according to claim 1 wherein the material of said sealing ring is a polytetrafluoroethylene moderately filled with carbon.

3. A valve according to claim 2 wherein the sealing ring material is filled with approximately eleven percent of carbon material.

4. A valve according to claim 1 including a plurality of sealing lips on the interior and exterior of said sealing ring with a groove between each pair of sealing lips.

5. A valve according to claim 4 including a soft sealing ring in the inner and outer grooves closest to the closed end of said sealing ring.

6. A valve according to claim 5 wherein said soft sealing rings are of a soft polytetrafluoroethylene.

7. A valve according to claim 1 including a taper on the inner surface of said load ring tapering inwardly toward said stem in a direction away from said valve member.

8. In a valve having a body with an internal valve chamber, an inlet to and an outlet from said valve chamber, an opening from said valve chamber, a valve member movable in the valve chamber and controlling flow through the valve, and a stem connected to said valve member and extending through said opening, a stem sealing assembly for sealing between said stem and the interior surface of the opening, and means for retaining said stem sealing assembly in position, comprising:

a sealing ring having an external sealing lip, an internal sealing lip and an end recess on the end of said sealing ring facing toward said valve member, and a load ring positioned within said end recess and having preselected dimensions to provide initial loading of said sealing lips and a base at the closed end of the recess which has a greater external radial dimension than the external radial dimension of the load ring at the open end of said recess.

9. A stem sealing assembly according to claim 8 including a plurality of sealing lips on the exterior and interior of said sealing ring.

10. A stem sealing assembly according to claim 9 including a soft seal ring in the inner and outer of said grooves closest to the closed end of said sealing ring.

11. A stem sealing assembly according to claim 10 wherein said soft seal rings are soft polytetrafluoroethylene.

12. A stem sealing assembly according to claim 8 wherein the exterior surface of said load ring is tapered outwardly away from said stem and away from said recess end of said sealing ring.

13. A stem sealing assembly according to claim 8 wherein the exterior surface of said load ring is tapered outwardly away from said stem and away from said recess end of said sealing ring and the interior surface of said load ring is tapered inwardly toward said stem and away from said recess end of said sealing ring.

14. A stem sealing assembly according to claim 8 wherein said sealing ring is a moderately filled polytetrafluoroethylene.

15. A stem sealing assembly according to claim 14 wherein said sealing ring material is filled with a carbon material.

16. A stem sealing assembly according to claim 14 wherein said sealing ring material is filled with approximately eleven percent.

17. A valve comprising a body having a valve chamber, an inlet into, an outlet from and an opening from said valve chamber extending through said body and a valve seat in said valve chamber, a valve member movably positioned in said valve chamber, a stem connected to said valve member and extending through said opening, means coacting with said stem to move said valve member with respect to said valve seat to control flow through said valve, and a stem sealing assembly for sealing between said stem and said opening and including a wear resistant and corrosion resistant sealing ring having a plurality of internal and external grooves with sealing lips between the grooves and an end recess, a load ring positioned in said end recess and having an external surface tapered toward the axis of said stem and toward said valve member, and a soft seal ring in each of the internal and external grooves nearest said valve member said soft seal rings having a cross-sectional area greater than the cross-sectioned area of their respective grooves.

* * * * *

UNITED STATES PATENT AND TRADEMARK OFFICE
CERTIFICATE OF CORRECTION

PATENT NO. : 4,553,759
DATED : November 19, 1985
INVENTOR(S) : James E. Kilmoyer It is certified that error appears in the above—identified patent and that said Letters Patent is hereby corrected as shown below:

Column 1, line 10, change "20°F." to "-20°F."
Column 1, line 63, change "fartherest" to "farthest".
Column 3, lines 9 and 49, change "fartherest" to "farthest".

Signed and Sealed this

First Day of April 1986

[SEAL]

Attest:

DONALD J. QUIGG

Attesting Officer

Commissioner of Patents and Trademarks